United States Patent [19]

Lee

[11] Patent Number: 5,671,032

[45] Date of Patent: Sep. 23, 1997

[54] FERROELECTRIC LIQUID CRYSTAL DEVICE FOR GRAY SCALE DISPLAY, GRAY SCALE DISPLAY APPARATUS AND METHOD ADOPTING THE SAME

[75] Inventor: Sang-rok Lee, Seongnam, Rep. of Korea

[73] Assignee: Samsung Display Devices Co., Ltd., Kyungki-do, Rep. of Korea

[21] Appl. No.: 580,421

[22] Filed: Dec. 28, 1995

[30] Foreign Application Priority Data

Dec. 29, 1994 [KR] Rep. of Korea ............... 94-38997

[51] Int. Cl.⁶ .................. G02F 1/1333; G02F 1/1343; G02F 1/13
[52] U.S. Cl. ............... 349/122; 349/85; 349/122; 349/142; 349/173
[58] Field of Search ................ 349/74, 85, 122, 349/142, 173

[56] References Cited

U.S. PATENT DOCUMENTS 5,257,122  10/1993  Dibal et al. ..................... 349/85
5,325,106  6/1994  Bahraman ....................... 345/56
5,519,520  5/1996  Stoller ........................... 349/32

Primary Examiner—Rodney B. Bovernick
Assistant Examiner—Julie Ngo
Attorney, Agent, or Firm—Leydig, Voit & Mayer

[57] ABSTRACT

A ferroelectric liquid crystal display device, and a gray scale display apparatus and method adopting the liquid crystal display device. In the ferroelectric liquid crystal display device, the region of a pixel is divided into a plurality of sub-regions having a predetermined size and a dielectric layer is formed on top of or beneath each transparent electrode of the divided sub-regions in the same thickness, wherein the permittivity of the dielectric layers is similar and the optical transmittance thereof is different, or both permittivity and optical transmittance of the dielectric layers are different. Then, the state of the ferroelectric liquid crystal corresponding to a specific sub-region is changed using a voltage sharing method adopting the principle of voltage drop by resistance. As a result, the transmittance of each divided sub-region can be different relatively, so that the gray scale display can be achieved with the further fractionized gray scale levels.

7 Claims, 5 Drawing Sheets

FERROELECTRIC LIQUID CRYSTAL DEVICE FOR GRAY SCALE DISPLAY, GRAY SCALE DISPLAY APPARATUS AND METHOD ADOPTING THE SAME

BACKGROUND OF THE INVENTION

The present invention relates to a ferroelectric liquid crystal display device for a gray scale display by which a totally even image can be provided, and a gray scale display apparatus and a method adopting the ferroelectric liquid crystal display device.

According to a conventional ferroelectric crystal display device, only two states of black and white (off and on) can be displayed; accordingly, a gray-scale display is impossible.

FIG. 1A shows a vertical section of one example of a conventional ferroelectric crystal display device for solving the above mentioned problem. Referring to FIG. 1, the ferroelectric crystal display device comprises a pair of glass substrates 1 and 11, transparent electrodes 2 and 12, a ferroelectric liquid crystal layer 4, and a stepped insulating layer 3. As is well known, transparent electrodes 2 and 12 generally comprise of indium-tin oxide (ITO) electrodes, and liquid crystal layer 4 comprises of various kinds of ferroelectric liquid crystals. Stepped insulating layer 3, which may be formed of polyamide resin, is placed on transparent electrode 12 which is formed on lower glass substrate 11, as shown in FIG. 1A. Each pixel region of the ferroelectric liquid crystal device is divided into three sub-regions X, Y and Z. Here, the thickness of the stepped insulating layer 3 is different in each of sub-regions X, Y and Z, so that sub-regions X, Y and Z provide capacitances $C_2^1$, $C_2^2$ and $C_2^3$, respectively, as shown in FIG. 1B.

Similarly, if the capacitances and resistance values with respect to each pixel sub-region of the liquid crystal layer 4 are represented as $C_1^1$, $C_1^2$ and $C_1^3$, ... and $R_2^1$, $R_2^2$ and $R_2^3$, ... the ferroelectric liquid crystal device can be represented as an equivalent circuit as shown in FIG. 1B. Here, the number of pixel regions is generalized as n.

Also, assuming that all pixel sub-regions have the same area and the ferroelectric liquid crystal layer 4 is much thicker than the stepped insulating layer 3, the capacitance and resistance values with respect to each pixel region of the ferroelectric liquid crystal device can be approximated as: $C_1^1 \approx C_1^2 \approx C_1^3$, and $R_1^2 \approx R_2^2 \approx R_{23}$. Here, the voltage applied to liquid crystal layer 4 is a function of the capacitances $C_2^1$, $C_2^2$ and $C_2C^3$, ... of the stepped insulting layer 3.

As described above, according to the conventional device, the thickness of the insulating layer between the upper and lower plates in a pixel is set differently with an arbitrary value and only the liquid crystal corresponding to a specific region in the insulating layer is selectively driven for the gray scale display. That is, gray-scale display is achieved using the difference of the optical transmittance according to the difference in the thickness of the insulating layer.

However, in the above gray scale display, the thickness of the liquid crystal layer is varied due to the different thickness of the insulating layer in a pixel, so that the light intensity transmitting through the liquid crystal layer is not uniform within a pixel. As a result, the image (luminance) is not uniform in a pixel.

SUMMARY OF THE INVENTION

To solve the above problem, it is an object of the present invention to provide a ferroelectric liquid crystal display device for a gray scale display, in which the thickness of a liquid crystal layer is uniform so as to provide a uniform illuminance in a pixel, and a gray scale display apparatus, and a method adopting the ferroelectric liquid crystal display device.

To achieve the above object, there is provided a ferroelectric liquid crystal display device comprising first and second substrates which oppose each other with a predetermined spacing, a first transparent electrode formed on an inner surface of the first substrate, a plurality of second transparent electrodes formed on an inner surface of the second substrate with respect to each pixel, each having a predetermined width, a plurality of dielectric layers formed on the plurality of second transparent electrodes, with the same thickness and having different optical transmittances, and a ferroelectric liquid crystal layer formed between the second substrate on which the dielectric layers are formed and the first substrate having the first transparent electrode thereon.

Also, there is provided a ferroelectric liquid crystal display device comprising first and second substrates which oppose each other with a predetermined spacing, a first transparent electrode formed on an inner surface of the first substrate, a plurality of dielectric layers formed on an inner surface of the second substrate with respect to each pixel with the same thickness and having different optical transmittances, a plurality of second transparent electrodes formed on the dielectric layers, and a ferroelectric liquid crystal layer formed between the second substrates on which the second transparent electrodes are formed and the first substrate having thereon the first transparent electrode.

It is preferable that the dielectric layers and the second transparent electrodes have the same width.

Also, to achieve the above object, there is provided a gray scale display apparatus comprising a liquid crystal display device having a plurality of transparent electrodes formed on an inner surface of one of first and second substrates opposing each other with a predetermined spacing, with respect to each pixel, and a plurality of dielectric layers formed on the transparent electrodes with the same thickness and having different optical transmittance, and a signal voltage dividing means for dividing a signal voltage applied to the terminals of the transparent electrodes so as to provide signals having different voltage levels.

Preferably, the signal voltage dividing means divides the signal voltage by connecting a predetermined number of resistors to each terminal of the transparent electrodes in each pixel.

Also, to achieve the above object, there is provided a gray scale display method in a gray scale display apparatus comprising a plurality of transparent electrodes formed on an inner surface of one of first and second substrates opposing each other with a predetermined spacing with respect to each pixel, a plurality of dielectric layers formed on the transparent electrodes with the same thickness and having different optical transmittances, and signal voltage dividing means for dividing a signal voltage applied to the terminals of the transparent electrodes so as to provide signals having different voltage levels. The method comprising the steps of dividing the applied signal voltage using the signal voltage dividing means connected to the transparent electrodes, and displaying a gray scale by driving the transparent electrodes when the voltage divided by the signal voltage dividing means is not less than a predetermined threshold voltage.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

In order to achieve a gray scale display while maintaining the thickness of a liquid crystal layer, each pixel of a ferroelectric liquid crystal display device is divided into a plurality of sub-regions and then each divided sub-region is driven after an electrode is formed on each sub-region, or dielectric layers having different permittivity are formed on the electrodes so that the effective capacitance becomes different in each sub-region. As a result, the applied signal voltage is differently recognized in each divided sub-region, thereby displaying the gray scale. Alternatively, the dielectric layers, each having similar permittivity and different optical transmittance, may be formed on each electrode, which are formed on the divided sub-regions, thereby achieving the gray scale display.

However, as the pixel is divided into many sub-regions each being driven by electrodes, the driving circuit becomes expensive. Also, it is relatively difficult to evenly form the dielectric layers having different permittivity so as to drive the divided sub-regions of each pixel with different capacitances. Thus, according to the present invention, the gray scale is displayed using the ferroelectric liquid crystal display device in which the dielectric layers each having similar permittivity and different optical transmittance are formed.

The structure of the ferroelectric liquid crystal display device according to the present invention will be described with reference to FIG. 2A.

Figure 1A:
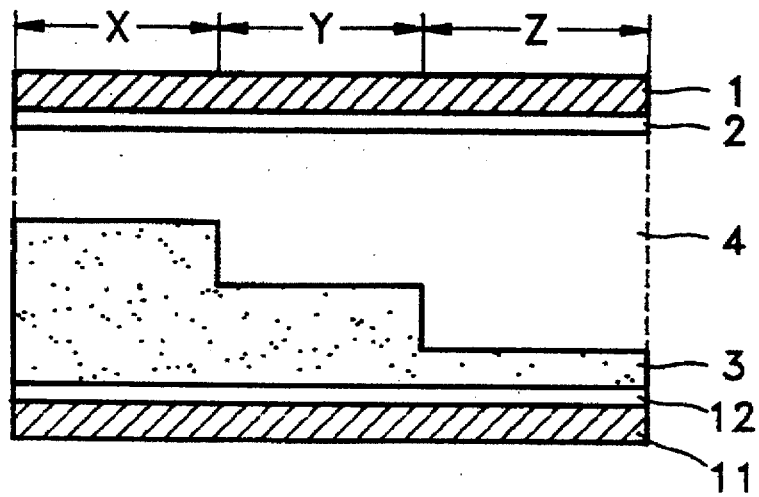
FIG. 1A is a vertical section view of a conventional ferroelectric liquid crystal display device for a gray scale display.
Figure 1B:
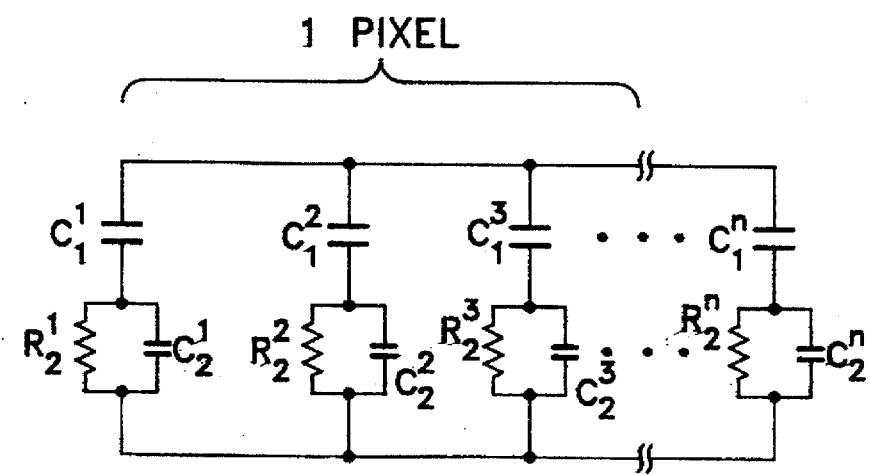
FIG. 1B is an equivalent electrical circuit diagram of the ferroelectric liquid crystal display device shown in FIG. 1A.
Figure 2A:
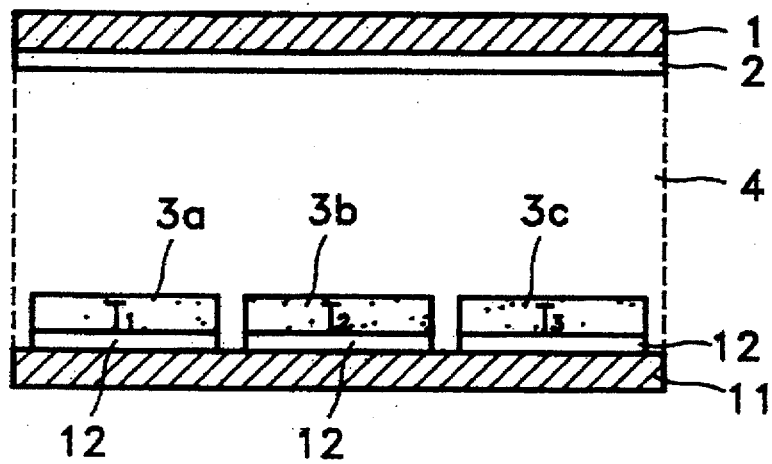
FIG. 2A is a vertical section view of a ferroelectric liquid crystal display device for the gray scale display according to an exemplary embodiment of the present invention.

As shown in FIG. 2A, a front glass substrate 1 and a rear glass substrate 11 which are opposing each other are positioned in a predetermined distance apart, and first and second transparent electrodes 2 and 12 are formed on the opposing surfaces of front and rear glass substrates, respectively. Here, the second transparent electrode 12 comprises, for example, three divisions in each pixel region and three dielectric layers 3a, 3b and 3c which have similar permittivity and different optical transmittances $T_1$, $T_2$ and $T_3$. The three divisions are formed on the second transparent electrode 12 with the same thickness. The space formed between rear glass substrate 11 on which dielectric layers 3a, 3b and 3c are formed and the front glass substrate 1 below which first transparent electrode 2 is formed is filled with a liquid crystal material 4.

In the ferroelectric liquid crystal display device having the above structure, the three dielectric layers 3a, 3b and 3c which have similar permittivity and different optical transmittance are provided as described above, so that eight ($2^3$) gray scales can be displayed through a circuit combination of three dielectric layers 3a, 3b and 3c.

Figure 2B:
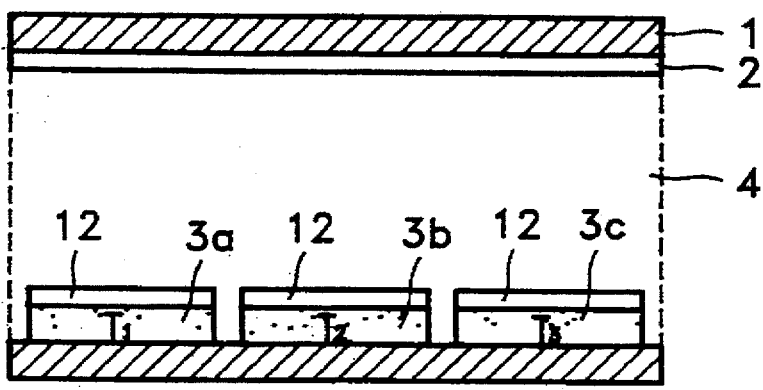
FIG. 2B is a vertical section view of a ferroelectric liquid crystal display device for the gray scale display according to another exemplary embodiment of the present invention.

FIG. 2B is a vertical section view of a ferroelectric liquid crystal display device for the gray scale display according to another preferred embodiment of the present invention. In this embodiment, the stacking sequence of the second transparent electrode 12 and dielectric layers 3a, 3b and 3c on the rear glass substrate is the opposite of that in the ferroelectric liquid crystal display device shown in FIG. 2A. The gray scale display method and the number of a circuit combination are also the same as those of the ferroelectric liquid crystal display device shown in FIG. 2A.

According to the ferroelectric liquid crystal display device having the above structure, the region of a pixel is divided into a plurality of sub-regions each having an arbitrary size, and dielectric layers having similar permittivity and different optical transmittance are formed on the portions of the first or second transparent electrode corresponding to the divided sub-regions in the same thickness, respectively. Then, the state of the ferroelectric liquid crystal corresponding to a specific sub-region is changed using a voltage sharing method adopting the principle of the voltage drop by resistance, so that the transmittance of each divided sub-region can be different. As a result, the level of the gray scale can be fractionized.

Figure 3A:
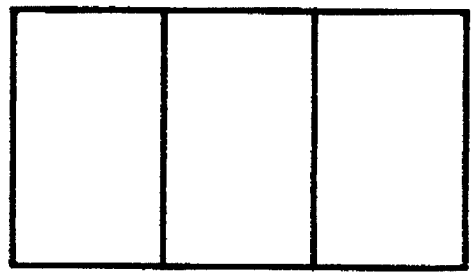
FIG. 3A is a diagram for illustrating a first pixel dividing method of the ferroelectric liquid crystal display devices shown in FIGS. 2A and 2B.
Figure 3B:
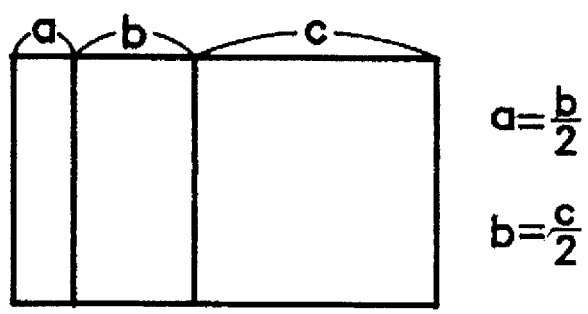
FIG. 3B is a diagram for illustrating a second pixel dividing method of the ferroelectric liquid crystal display devices shown in FIGS. 2A and 2B.

For example, as shown in FIG. 3A, when the dielectric layers, each having different permittivity are evenly divided, the gray level between divided sub-regions is not discriminated, so that only four gray levels (all sub-regions on, two sub-regions on, one sub-region on, all sub-regions off) can be expressed. However, as shown in FIG. 3B, when the dielectric layers are not evenly divided, the gray level between the divided sub-regions is discriminated. Thus, eight ($2^3$) gray levels can be expressed by combining each gray level of the divided sub-regions.

However, if the optical transmittance of each evenly divided dielectric layer of FIG. 3A is different, the lightness between the sub-regions is discriminated, so that eight gray levels can be expressed as in the case of FIG. 3B. Also, evenly dividing the dielectric layer provides an advantage in the manufacturing process. Assuming that a relative transmittance of a region is 100%, the relative transmittance values of b and c may be 50% and 25%, respectively.

The gray scale display apparatus and method adopting the ferroelectric liquid crystal display device according to the present invention will be described with reference to FIGS. 4 and 5A–5D.

Figure 4:
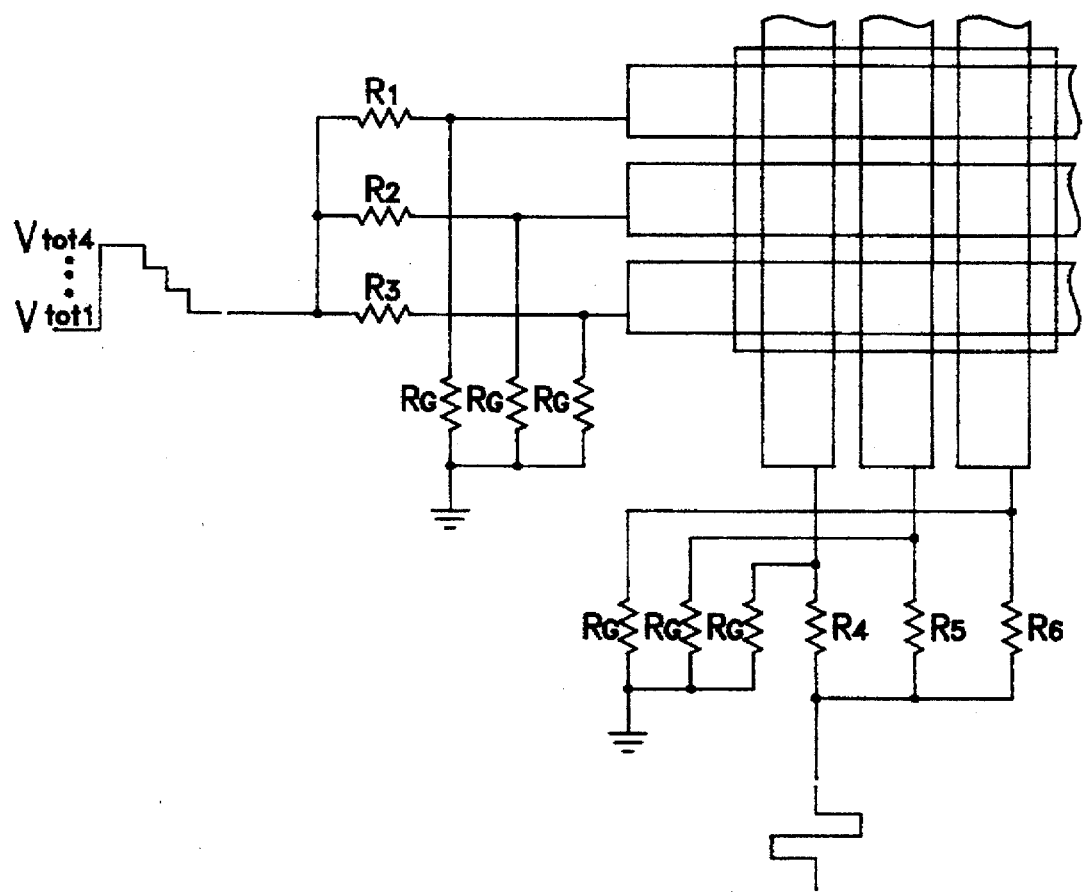
FIG. 4 is a circuit diagram of a gray scale display apparatus adopting the ferroelectric liquid crystal display device according to the present invention.
Figure 5A:
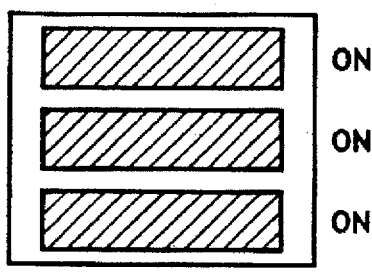
FIGS. 5A–5D are diagrams for illustrating the gray-scale display methods in the gray scale display apparatus according to the present invention.
Figure 5B:
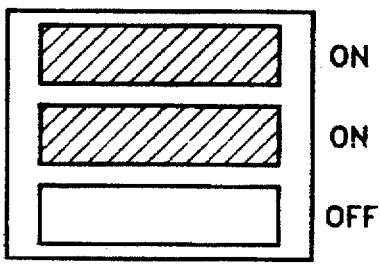
Figure 5C:
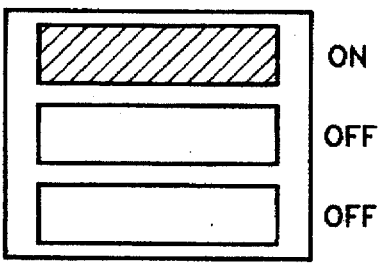
Figure 5D:
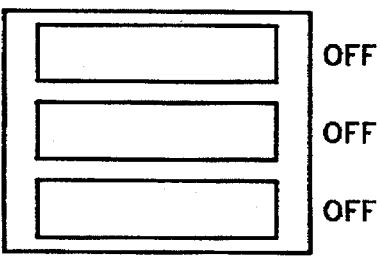

As shown in FIG. 4, according to the gray scale display apparatus of the present invention, each pixel region of the ferroelectric liquid crystal display device is divided into nine sub-regions. Here, each pixel region is provided with three column and row electrodes, wherein resistors are connected to the ends of column and row electrodes, respectively, thereby dividing the signal voltage applied to the electrodes. That is, as shown in FIG. 4, resistors $R_1$, $R_2$, $R_3$ and $R_G$ each having different resistance values are connected to the ends of the column electrodes and resistors $R_4$, $R_5$, $R_6$ and $R_G$ each having different resistance values are connected to the ends of the row electrodes. Here, the other end of each resistor is connected to a main signal terminal.

Also, the voltage level of the signal input to each main signal terminal is set to four levels, the voltage input to each electrode, which is dropped via each resistor, is adjusted to be over threshold voltage $V_{th}$ which affects the state of the liquid crystal.

For example, as shown in FIGS. 5A–5D, when the voltage (total voltage $V_{tot1} \sim V_{tot4}$) of the main signal terminal is divided and then applied to each column electrode as follows, each sub-region of the pixel is partially driven according to whether the condition of the following table is satisfied. As a result, the gray scale display can be achieved. That is, the voltage level of the applied main signal is divided by the resistors each connected to three transparent electrodes of each pixel. Here, each sub-region of the pixel is driven or not driven according to whether the divided voltage level is not less than the threshold voltage, thereby displaying the gray scale.

| No. | condition | resulting gray-scale display state | FIGURE |
|---|---|---|---|
| 1 | $V_{tot4} - I_1R_1 = V_1 \geq V_{th}$<br>$V_{tot4} - I_2R_2 = V_2 \geq V_{th}$<br>$V_{tot4} - I_3R_3 = V_3 \geq V_{th}$ | ON-ON-ON | 6A |
| 2 | $V_{tot3} - I_1R_1 = V_1 \geq V_{th}$<br>$V_{tot3} - I_2R_2 = V_2 \geq V_{th}$<br>$V_{tot3} - I_3R_3 = V_3 < V_{th}$ | ON-ON-OFF | 6B |
| 3 | $V_{tot2} - I_1R_1 = V_1 \geq V_{th}$<br>$V_{tot2} - I_2R_2 = V_2 < V_{th}$<br>$V_{tot2} - I_3R_3 = V_3 < V_{th}$ | ON-OFF-OFF | 6C |
| 4 | $V_{tot1} - I_1R_1 = V_1 < V_{th}$<br>$V_{tot1} - I_2R_2 = V_2 < V_{th}$<br>$V_{tot1} - I_3R_3 = V_3 < V_{th}$ | OFF-OFF-OFF | 6D |

Also, if the voltage level of the signal applied to the row electrodes is adjusted in the same manner as above, more gray scales can be displayed.

As described above, in the ferroelectric liquid crystal display device, and gray scale display apparatus and method adopting the same according to the present invention, the region of a pixel is divided into a plurality of sub-regions each having an arbitrary size, the dielectric layer is formed atop or beneath each transparent electrode corresponding to the divided sub-regions in the same thickness, respectively, wherein the permittivity of the dielectric layers is similar and the optical transmittance thereof is different, or both permittivity and optical transmittance of the dielectric layers are different. Then, the state of the ferroelectric liquid crystal corresponding to each sub-region is selectively changed using the voltage sharing method adopting the principle of the voltage drop by resistance. As a result, the lightness of each divided sub-region can be different, so that the gray scale display can be achieved with the further fractionated gray scale levels. Accordingly, the gray scale can be further effectively displayed without the unevenness of the displayed screen due to the difference in thickness of the ferroelectric liquid crystal layer within a pixel.

What is claimed is:

1. A ferroelectric liquid crystal display device comprising:
   first and second substrates positioned in opposition with respect to one another, the first and second substrate being separated by a predetermined distance;
   a first transparent electrode formed on an inner surface of said first substrate;
   a plurality of second transparent electrodes formed on an inner surface of said second substrate in positions corresponding to each pixel region, each of said plurality of second transparent electrodes having a predetermined width;
   a plurality of dielectric layers formed on said plurality of second transparent electrodes, said plurality of dielectric layers having the same thickness and different optical transmittances; and
   a ferroelectric liquid crystal layer formed between said second substrate on which said dielectric layers are formed and said first substrate having said first transparent electrode thereon.

2. The ferroelectric liquid crystal display device as claimed in claim 1, wherein said second transparent electrodes and said dielectric layers have the same width.

3. A ferroelectric liquid crystal display device comprising:
   first and second substrates positioned in opposition with respect to one another, the first and second substrates being separated by a predetermined distance;
   a first transparent electrode formed on the inner surface of said first substrate;
   a plurality of dielectric layers formed on the inner surface of said second substrate in positions corresponding to each pixel region, each of said plurality of dielectric layers having the same thickness and different optical transmittances;
   a plurality of second transparent electrodes formed on said plurality of dielectric layers; and
   a ferroelectric liquid crystal layer formed between said second substrate on which said second transparent electrodes are formed and said first substrate having said first transparent electrode.

4. The ferroelectric liquid crystal display device as claimed in claim 3, wherein said dielectric layers and said second transparent electrodes have the same width.

5. A gray scale display apparatus comprising:
   a liquid crystal display device including:
   first and second substrates positioned in opposition with respect to one another, the first and second substrates being separated by a predetermined distance;
   a first transparent electrode formed on an inner surface of said first substrate;
   a plurality of second transparent electrodes formed on an inner surface of said second substrate in positions corresponding to each pixel region, each of said plurality of second transparent electrodes having a predetermined width;
   a plurality of dielectric layers formed on said plurality of second transparent electrodes, said plurality of dielectric layers having the same thickness and different optical transmittances; and
   a ferroelectric liquid crystal layer formed between said second substrate on which said dielectric layers are formed and said first substrate having said first transparent electrode thereon; and
   a signal voltage dividing means for dividing a signal voltage applied to terminals of said transparent electrodes so as to provide signals having different voltage levels.

6. The gray scale display apparatus as claimed in claim 5, wherein said signal voltage dividing means divides the signal voltage by connecting a predetermined number of resistors to each terminal of said transparent electrodes in each pixel.

7. A gray scale display method in a gray scale display apparatus comprising a plurality of transparent electrodes formed on the inner surface of one of first and second substrates opposing each other and separated by a predetermined distance with respect to each pixel, a plurality of dielectric layers formed on said transparent electrodes with the same thickness and having different optical transmittances, and signal voltage dividing means for dividing a signal voltage applied to the terminals of said transparent electrodes so as to provide signals having different voltage levels, comprising the steps of:

dividing the applied signal voltage using said signal voltage dividing means connected to said transparent electrodes; and displaying a gray scale by driving said transparent electrodes when the voltage divided by said signal voltage dividing means is not less than a predetermined threshold voltage.

* * * * *